US012560622B2

(12) United States Patent
Shin et al.

(10) Patent No.: US 12,560,622 B2
(45) Date of Patent: Feb. 24, 2026

(54) SHAKING BLOCK, SHAKING DEVICE COMPRISING DETACHABLE MODULE, AND LIQUID HANDLING SYSTEM COMPRISING SAME

(71) Applicant: ABLE LABS INC., Incheon (KR)

(72) Inventors: Sang Shin, Incheon (KR); Nam Il Ko, Incheon (KR); Sang Young Park, Gyeonggi-do (KR)

(73) Assignee: ABLE LABS INC., Incheon (KR)

( * ) Notice: Subject to any disclaimer, the term of this patent is extended or adjusted under 35 U.S.C. 154(b) by 0 days.

(21) Appl. No.: 18/835,715

(22) PCT Filed: Nov. 8, 2022

(86) PCT No.: PCT/KR2022/017420
§ 371 (c)(1),
(2) Date: Aug. 2, 2024

(87) PCT Pub. No.: WO2023/149621
PCT Pub. Date: Aug. 10, 2023

(65) Prior Publication Data
US 2025/0116679 A1     Apr. 10, 2025

(30) Foreign Application Priority Data
Feb. 3, 2022   (KR) ........................ 10-2022-0014029

(51) Int. Cl.
*G01N 35/00*       (2006.01)
*B01F 31/22*       (2022.01)
(Continued)

(52) U.S. Cl.
CPC ........... *G01N 35/0098* (2013.01); *B03C 1/01* (2013.01); *B03C 1/288* (2013.01);
(Continued)

(58) Field of Classification Search
None
See application file for complete search history.

(56) References Cited

U.S. PATENT DOCUMENTS 5,558,839 A   9/1996  Matte et al.
5,770,461 A   6/1998  Sakazume et al.
(Continued)

FOREIGN PATENT DOCUMENTS

CN         104117429       10/2014
EP         3 734 295       11/2020
(Continued)

OTHER PUBLICATIONS

Kolver, "Basic Theory of Threaded Fasteners," 2023, <https://kolver.com/us/blog-detail/basic-theory-of-threaded-fasteners#:~:text=The%20shaft%20of%20a%20screw,amount%20of%20pulling%20force%20applied> (Year: 2023).*

(Continued)

*Primary Examiner* — Elizabeth A Robinson
*Assistant Examiner* — Brittany I Fisher
(74) *Attorney, Agent, or Firm* — WOMBLE BOND DICKINSON (US) LLP

(57) ABSTRACT

A separator device for separating a target substance bonded to magnetic particles from a sample comprises: a magnetic block including a magnetic plate, a vertical movement device for controlling the vertical position of the magnet plate by vertically transferring the magnet plate, and a casing for accommodating the vertical movement device and the magnet plate; and a shaking block coupled to the lower portion of the magnetic block so as to transmit rotational force, and thus the magnetic block performs a horizontal orbital motion, wherein a loading portion in which a well plate is to be horizontally loaded is formed at the upper end of the magnetic block, and the magnetic block and the (Continued)

shaking block are vertically coupled to be an integrated single device.

5 Claims, 8 Drawing Sheets

(51) Int. Cl.
| | |
|---|---|
| *B01F 31/25* | (2022.01) |
| *B01F 31/50* | (2022.01) |
| *B03C 1/01* | (2006.01) |
| *B03C 1/28* | (2006.01) |
| *G01N 35/10* | (2006.01) |

(52) U.S. Cl.
CPC ... *G01N 35/00029* (2013.01); *G01N 35/1011* (2013.01); *B03C 2201/18* (2013.01); *B03C 2201/26* (2013.01); *G01N 2035/00524* (2013.01); *G01N 2035/00564* (2013.01); *G01N 2035/103* (2013.01)

(56) References Cited

U.S. PATENT DOCUMENTS

| | | | |
|---|---|---|---|
| 6,187,270 B1 | 2/2001 | Schmitt et al. | |
| 6,294,342 B1* | 9/2001 | Rohr | G01N 33/54333 |
| | | | 435/7.1 |
| 10,279,327 B2 | 5/2019 | Corves et al. | |
| 2004/0151064 A1* | 8/2004 | Yi | B01F 31/20 |
| | | | 366/209 |
| 2011/0017544 A1* | 1/2011 | Bodwell | H02K 5/24 |
| | | | 181/200 |
| 2013/0252249 A1 | 9/2013 | Belz et al. | |
| 2018/0008943 A1 | 1/2018 | Corves et al. | |
| 2019/0039034 A1* | 2/2019 | Siow | B01F 31/27 |

FOREIGN PATENT DOCUMENTS

| | | |
|---|---|---|
| FR | 1 437 055 | 4/1966 |
| JP | 63-210773 | 9/1988 |
| JP | 2021-105615 | 7/2021 |
| KR | 10-2009-0107927 | 10/2009 |
| KR | 10-1718344 | 3/2017 |
| KR | 10-2017-0047885 | 5/2017 |

OTHER PUBLICATIONS

International Search Report for PCT/KR2022/017420 mailed on Feb. 13, 2023 and its English translation from WIPO (now published as WO2023/149621).

Written Opinion of the International Searching Authority for PCT/KR2022/017420 mailed on Feb. 13, 2023 and its English translation by Google Translate (now published as WO2023/149621).

Office Action dated Apr. 8, 2022 for Korean Patent Application No. 10-2022-0014029 and its English translation provided by Applicant's foreign counsel, including the Verification of Translation.

Notice of Allowance dated Sep. 15, 2022 for Korean Patent Application No. 10-2022-0014029 and its English translation provided by Applicant's foreign counsel, including the Verification of Translation.

Extended European Search Report dated Apr. 9, 2025 for European Patent Application No. 22925088.1.

* cited by examiner

SHAKING BLOCK, SHAKING DEVICE COMPRISING DETACHABLE MODULE, AND LIQUID HANDLING SYSTEM COMPRISING SAME

CROSS REFERENCE TO RELATED APPLICATIONS

This application is the U.S. National Stage of International Patent Application No. PCT/KR2022/017420 filed on Nov. 8, 2022, which claims the priority to Korean Patent Application No. 10-2022-0014029 filed in the Korean Intellectual Property Office on Feb. 3, 2022, the entire contents of which are incorporated herein by reference.

TECHNICAL FIELD

The present invention relates to a shaking block, a shaking device including a detachable module, a liquid handling system including a shaking device, and a method of automatically separating a target substance.

BACKGROUND ART

An automated liquid handling system is an automated equipment designed for convenient washing, dilution, incubation, dispensing, and labware movement so that a large amount of samples may be efficiently processed at high speed.

In particular, when using an automated liquid handling system equipped with a multi-channel pipette module, multiple samples may be simultaneously dispensed through multiple channels, so that high-speed processing may be stably performed. The automated liquid handling system includes a robot unit (or a three-dimensional transfer mechanism) that moves in three dimensions to transfer a predetermined amount of liquid, a pipette module that is coupled to the robot unit and is automatically transferred according to a program, a control unit that has a memory in which the program is stored and controls the operation of the robot unit and the pipette module, and a deck on which sample containers or processing blocks are seated. In particular, a multi-channel pipette module in which multiple pipette tips are aligned automatically transfers liquids such as samples, drugs, or the like, into a well plate by being coupled to a robot arm or a three-dimensional transfer mechanism.

Meanwhile, thermal shakers, target (substance) separation devices, and the like, have been developed and used as individual devices for biological experiments and production.

The thermal shaker is a device having heating/cooling temperature control and stirring functions, and is also referred to as a shaking incubator.

Further, various target separation methods to separate nucleic acids, proteins, and the like, from biological samples have been developed. Among them, a method and device of separating a target from a biological sample using magnetic microparticles or magnetic nanoparticles are mainly developed for application in various analyses and tests, such as a diagnostic test using an antigen-antibody reaction, mass spectrometry, extraction of nucleic acids such as RNA, DNA, mRNA, and the like, ELISA or electroluminescence assay for proteins, chemiluminescence analysis, and next generation sequencing (NGS).

Pasteur Sanofi Diagnostics has developed a method of agglomerating magnetic particles on the bottom of a 96-well plate and resuspending the particles (U.S. Pat. No. 5,558, 839). Biochemical substances may be quickly attached to fine magnetic particles in a suspension state of a solution, a magnetic field may be applied to agglomerate the magnetic particles to which a target substance is attached, and then the solution may be removed, thereby easily separating the target substance.

In Japanese Laid-Open Patent No. S63-210773, a magnetic field is applied to a suspension of a sample and magnetic particles using magnetic particles immobilizing a substance that specifically binds to a substance to be measured (target substance), and the magnetic particles are displaced by the application of the magnetic field so that a reaction between the substance immobilized by the fine particles and the substance to be measured is promoted.

For the method of separating a target substance using magnetic particles, various methods in which a target substance bound to fine magnetic materials is agglomerated using a magnetic field, and then the target substance is suspended through a washing process have been developed. For example, a method in which agglomeration and suspension are possible using a constant magnetic field and an alternating magnetic field (U.S. Pat. No. 5,770,461), a method of agglomerating magnetic particles and separating the magnetic particles from a solution by bringing a permanent magnet close to a disposable tip of a pipette and attaching the magnetic particles thereto to agglomerate the magnetic particles (U.S. Pat. No. 6,187,270), and the like, have been suggested. Since, in the separation methods in the related art, the biological target to which magnetic particles are coupled is agglomerated using a permanent magnet or electromagnet and is suspended using a magnetic rod or alternating magnetic field, the efficiency or degree of suspension is low.

Since the separation devices, thermal shakers, and the like, in the related art are complex and large in size to be applied to a general-purpose automated liquid handling system, the separation devices, thermal shakers, and the like are provided as separate devices. Therefore, since a separate device has to be provided in addition to the general-purpose liquid robot handler, there is a problem that costs increase.

DISCLOSURE

Technical Problem

In order to solve the aforementioned problem, the present invention is directed to providing a small shaking block capable of being mounted on a deck of an automated liquid handling system and transmitting an orbital rotational force by being coupled to various upper casings, and a shaking device including the shaking block.

The present invention is also directed to providing a shaking device that is easy for experiments on which an upper block (module) for mixing, separation, cooling, heating, or the like, which is important in incubation or bio experiments, is detachably mounted.

The present invention is also directed to providing an integrated magnetic separation device having excellent separation quality of target substances and capable of being mounted on a deck of an automated liquid handling system.

Technical Solution

A shaking device according to one aspect of the present invention includes an upper block including one or more components for processing a liquid sample and a casing for accommodating the one or more components therein and a shaking block coupled to a lower portion of the upper block.

The shaking block includes a rotary motor, a bearing, and a housing, and the shaking block transmits a rotational force through a bearing coupling portion so that the upper block performs orbital motion. Preferably, the upper block and the shaking block are vertically coupled by fastening of a plurality of elastic fasteners.

The upper block and the shaking block may be spaced apart from each other and directly connected only by the bearing coupling portion and the plurality of elastic fasteners. The plurality of elastic fasteners may fasten the magnetic block and the shaking block so that relative positions thereof are variable by a predetermined deviation.

The casing and the housing may be fixedly coupled vertically by fastening of a plurality of elastic fasteners. Preferably, the casing and the housing may be vertically spaced apart from each other and directly connected only by the bearing coupling portion and the plurality of elastic fasteners.

The plurality of elastic fasteners may fasten the casing and the housing so that relative positions thereof are variable by a predetermined deviation.

Each of the plurality of elastic fasteners may include an elastic member and first and second fastening members respectively coupled to upper and lower sides of the elastic member.

Each of the plurality of elastic fasteners may be bolts with an elastic member between the bolts, and the elastic member may be rubber or silicone.

The shaking block may include the housing, the rotary motor fixed to the housing, an eccentric cam fixedly coupled to a shaft of the rotary motor, and the bearing.

The plurality of elastic fasteners may be positioned symmetrically to each other on the outer sides of the housing, and the housing may be coupled to the casing by the plurality of elastic fasteners.

The shaft of the rotary motor may be eccentric from the center of the bearing by the eccentric cam, an outer circumference of the bearing may be fixed to a lower portion of the casing, and a rotational force of the rotary motor may cause orbital shaking of the upper block through the eccentric cam and the bearing.

An annular insertion section, which the bearing to be inserted in, may be formed in one region of a bottom surface of the casing and the outer circumference thereof is in contact with an inner circumference of the insertion section. The housing may have a quadrilateral cylindrical shape, and steps may be formed on four corners so that each of the plurality of elastic fasteners are positioned on the respective corners.

Each elastic fastener may include an elastic member and first and second fastening members respectively coupled to upper and lower sides of the elastic member, and an upper portion of the first fastening member may be fastened to a lower edge of the casing and a lower portion thereof may be fixed to the elastic member. An upper portion of the second fastening member may be fixed to a lower portion of the elastic member, and a lower portion thereof may be fastened to the step of the housing.

The shaking device may be a separation device for separating a target substance bound to magnetic particles from the sample. The upper block may be a magnetic block, include a magnetic plate, a vertical movement mechanism that transfers the magnetic plate in a vertical direction to control a vertical position of the magnetic plate, and a casing that accommodates the vertical movement mechanism and the magnetic plate, and have a seating portion formed at an upper end.

The magnetic plate may be transferred by the vertical movement mechanism and disposed adjacent to and facing a lower portion of a well plate seated on the seating portion when positioned at an uppermost end.

The vertical movement mechanism may include a moving motor fixed inside the casing, a link connected to a rotation shaft of the moving motor to convert rotational motion of the moving motor into vertical movement, and a fixing member connecting the link to the magnetic plate.

According to another aspect, the shaking device may be a thermo shaker for controlling temperature of the sample. In this case, the upper block may be a temperature block and may include a container for accommodating a sample, a temperature control unit (thermoelectric element or cooling circuit), and a casing containing the container and the temperature control unit. The shaking module may be the same as that described above.

According to still another aspect of the present invention, the upper block may be a temperature control block or a module capable of mixing, separating, cooling, heating, or the like, required for bio experiments, and include the casing and is detachable from the shaking block. A coupling structure in this case is as described above.

According to yet another aspect of the present invention, there is provided an automated liquid handling system including a pipette module including one or more pipettes for aspirating and discharging a liquid, a transfer unit configured to transfer the pipette module, a deck disposed at a lower portion to seat one or more modules or a well plate, the shaking device supported and seated on the deck; and the well plate detachably mounted on a top of the separation device. The pipette module may dispense a liquid sample into a plurality of wells formed in the well plate.

According to another aspect of the present invention, there is provided a shaking block that is coupled to a lower portion of a casing that accommodates a plurality of components and transmits a rotational force to the casing through a bearing coupling portion. The shaking block includes a rotary motor, a bearing, and a housing, and the casing and the housing are fixedly coupled vertically by fastening of a plurality of elastic fasteners.

The plurality of elastic fasteners fasten the casing and the housing so that relative positions thereof are variable by a predetermined deviation. The casing and the housing are vertically spaced apart from each other and are directly connected only by the bearing coupling portion and the plurality of elastic fasteners.

According to another aspect of the present invention, there is provided a separation device for separating a target substance bound to magnetic particles from a sample. The separation device includes a magnetic block including a magnetic plate, a vertical movement mechanism that transfers the magnetic plate in a vertical direction to control a vertical position of the magnetic plate, and a casing that accommodates the vertical movement mechanism and the magnetic plate, and has a seating portion formed at an upper end and a shaking block coupled to a lower portion of the magnetic block and configured to transmit a rotational force through a bearing coupling portion to the magnetic block, thereby causing the magnetic block to perform orbital motion.

The magnetic block and the shaking block are vertically coupled by fastening of a plurality of elastic fasteners and the magnetic block and the shaking block are vertically spaced apart from each other and are directly connected only by the bearing coupling portion and the plurality of elastic fasteners.

The plurality of elastic fasteners fasten the magnetic block and the shaking block so that relative positions thereof are variable by a predetermined deviation. The magnetic plate may be transferred by the vertical movement mechanism and disposed adjacent to and facing a lower portion of a well plate seated on the seating portion when positioned at an uppermost end.

Preferably, the vertical movement mechanism may include includes a moving motor fixed inside the casing, a link connected to a rotation shaft of the moving motor to convert rotational motion of the moving motor into vertical motion, and a fixing member connecting the link to the magnetic plate.

According to another embodiment of the present invention, there is provided a method of separating a target substance reversibly bound to magnetic particles using an automated liquid handling apparatus. The method includes transferring the magnetic plate upward to be close to a well plate mounted on the seating portion so that the target substance is aggregated at a lower portion of the well in a state of accommodating a sample solution containing the target substance bound to magnetic particles in the well of the well plate, aspirating and discharging, by a pipette module automatically transferred by a transfer unit, the sample solution in a state in which the target substance is agglomerated at the lower portion of the well by a magnetic field applied by the magnetic plate, removing impurities from the target substance by discharging a cleaning solution into the well by the pipette module and then aspirating the cleaning solution again, removing a magnetic force applied to the target substance bound to the magnetic particles by transferring the magnetic plate downward from the well plate, and separating the target substance from the lower portion of the well and floating the target substance by the shaking block orbitally shaking the well plate through the magnetic block.

The method of separating a target substance reversibly bound to magnetic particles using the separation device may include the following steps:

transferring the magnetic plate upward to be close to a well plate mounted on the seating portion so that the target substance is aggregated at a lower portion of the well, wherein a sample solution including the target substance bound to magnetic particles is contained in the well of the well plate;

aspirating and discharging, by a pipette module automatically transferred by a transfer unit, the sample solution in which the target substance is aggregated in the lower portion of the well by a magnetic field applied by the magnetic plate;

removing impurities from the target substance by discharging a cleaning solution into the well and then aspirating the cleaning solution again by the pipette module;

removing a magnetic force applied to the target substance bound to the magnetic particles by transferring the magnetic plate downward from the well plate; and separating the target substance from the lower portion of the well and floating the target substance by the shaking block orbitally shaking the well plate through the magnetic block.

Advantageous Effects

According to one aspect of the present invention, a small shaking block capable of being mounted on a deck of an automated liquid handling system and capable of being coupled to a block such as a temperature block, a magnetic block, or the like, and a shaking device of temperature, magnetism, or the like including the same are provided.

According to another aspect of the present invention, experiments and production automation in the bio and molecular biology industries are improved by providing a shaking device capable of being mounted on a lower deck of a liquid handling system.

According to still another aspect of the present invention, a small, integrated magnetic separation device having excellent quality of separation of a target substance and capable of being mounted on a deck of a general-purpose liquid handling system can be provided, and the device can offer excellent ease of use and cost saving.

MODES OF THE INVENTION

Figure 1:
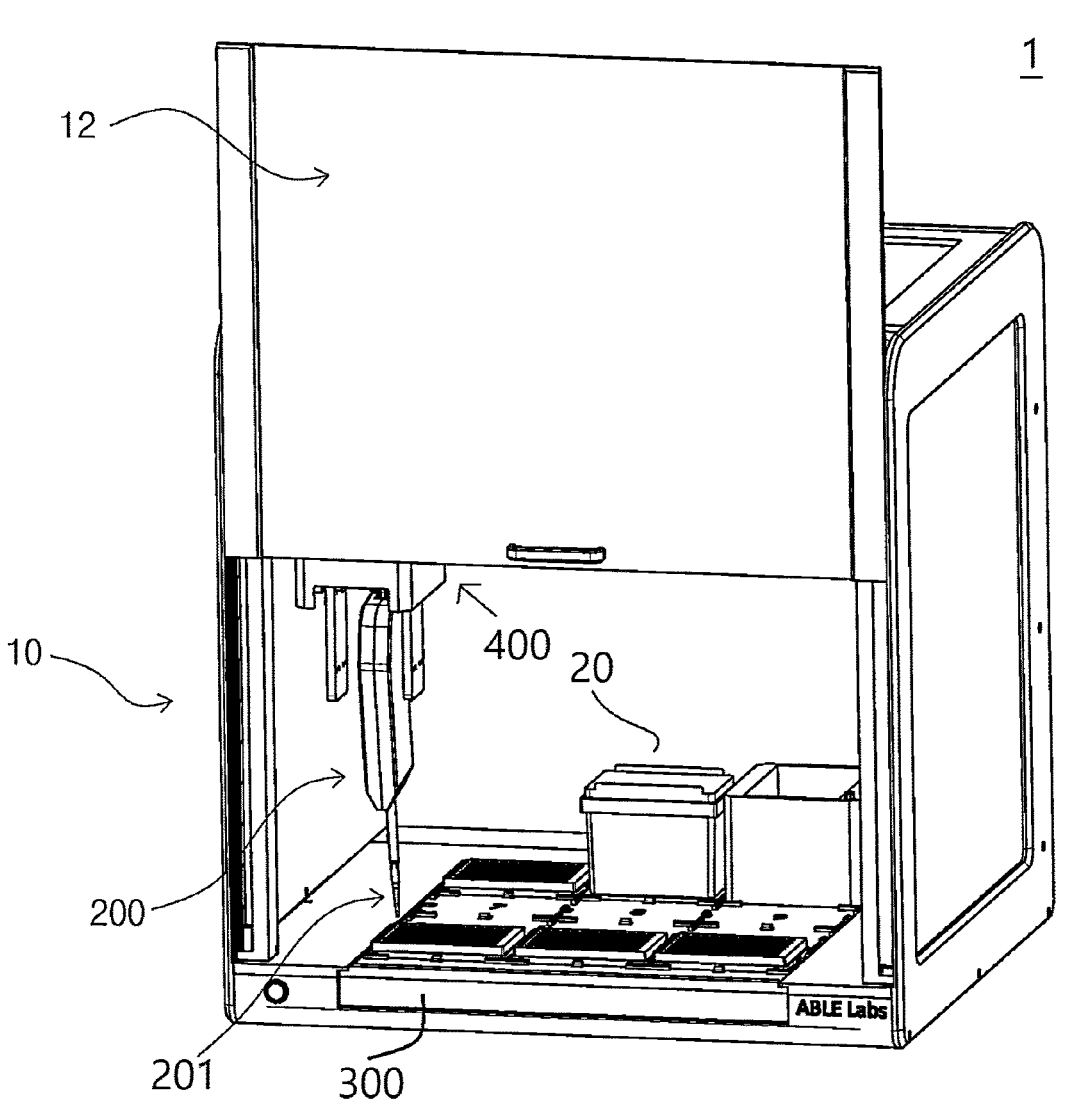
FIG. 1 is a perspective view showing one embodiment of an automated liquid handling system (1) according to the present invention.

Hereinafter, embodiments of the present invention will be described in detail with reference to the accompanying drawings so that those skilled in the art may easily perform the present invention. However, the present invention may be implemented in many different forms and is not limited to the embodiments described herein. In the drawings, in order to clarify the present invention, parts that are not related to description are omitted and like reference numerals represent like elements throughout the specification. In the process, thicknesses of lines, dimensions of elements, and the like shown in the drawings may be exaggerated for clarity and convenience.

Throughout the specification, when a part is referred to as being "connected" or "coupled" to another part, it includes not only a circumstance when the part is "directly connected" or "directly coupled to" the other part, but also a circumstance when the part is "connected" or "coupled" to the other part with another member interposed therebetween. In addition, when a part "includes" or "comprises" a component, unless described to the contrary, the term "includes" or "comprises" does not indicate that the part excludes another component but instead indicates that the part may further include the other component.

Hereinafter, embodiments according to the present invention will be described in detail with reference to the attached drawings. A device and method of separating each target substance contained in a biological sample solution using magnetic particles will be described.

FIG. 1 is a perspective view showing an automated liquid handling system 1 according to one embodiment of the present invention. The liquid handling system 1 according to one embodiment of the present invention includes a transfer unit 400 disposed in a case 10, a pipette module 200 mounted on the transfer unit, and a control means (not shown). The automated liquid handling system 1 may further include a door 12 capable of being slidably opened and closed, and a deck 300 for various modules 20 to be seated at an upper end thereof is disposed at a lower portion of the case 10.

The transfer unit 400 may include an XY-gantry that moves two-dimensionally in a horizontal direction and a Z-axis drive unit that moves up and down, but may be a three-dimensional transfer robot, and any known transfer device capable of three-dimensional transfer is sufficient. In a preferred embodiment of the present invention, the pipette module 200 is mounted on a robot head of the transfer unit 400. The pipette module 200 is an extraction means for extracting or separating biological substances or nucleic acids from a biological sample, and aspirates a liquid sample in a container, transfers the liquid sample in a three-dimensional space, and discharges the liquid sample on a well plate.

Meanwhile, a plurality of partitioned seating portions are formed on the deck 300, so that various modules or devices 20, such as a pipette tip array, a sample container, a thermal shaker, a well plate stack, and a separation device, may be seated. The control means may be included inside the liquid handling system in the form of a PCB or as a part of the pipette module, but may also be an external and/or internal information processing device connected to the liquid handling system through wired or wireless communication. The information processing device may include a processor, a memory, and a communication module, and an automated liquid handling process may be implemented as a software program stored in the memory and may be executed by the processor, so that the operations of the transfer unit and the pipette module of the automated liquid handler may be controlled by the software program.

Hereinafter, a configuration of a separation device 100 according to one embodiment of the present invention will be described in detail with reference to FIGS. 2 to 4.

Figure 2:
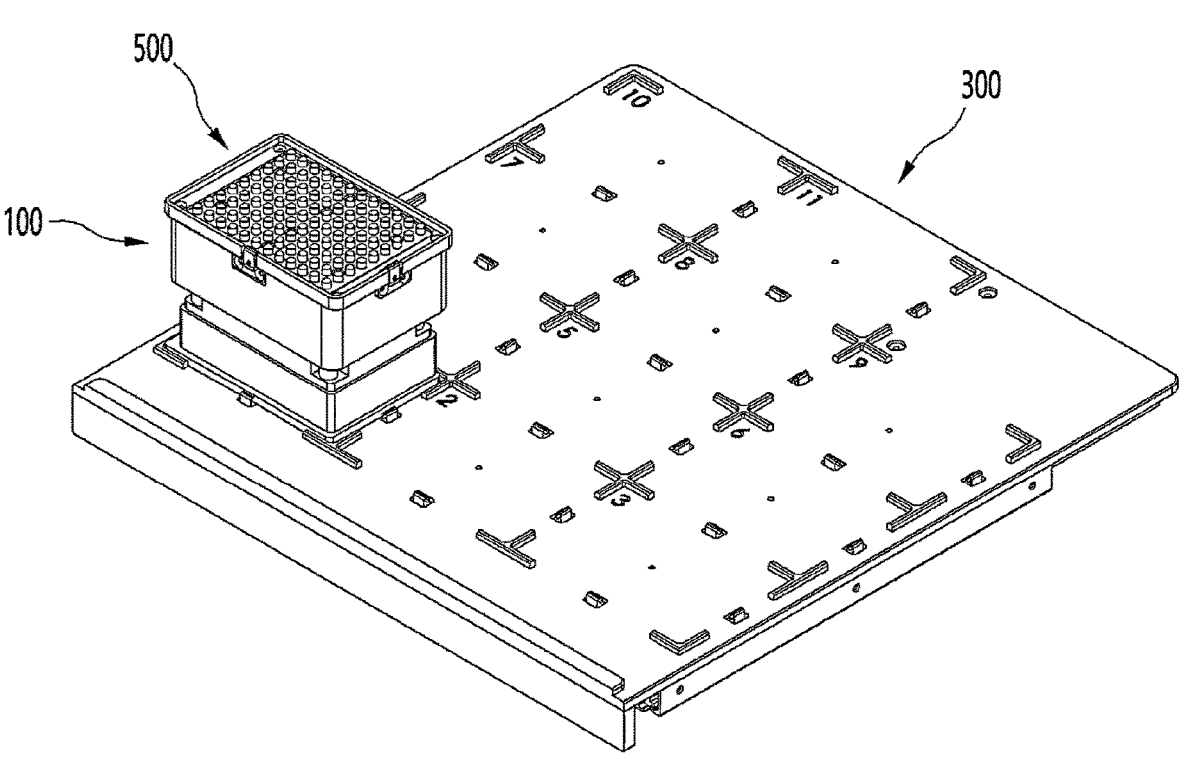
FIG. 2 is a partial perspective view showing a state in which a separation device (100) on which a multi-well plate (500) according to one embodiment of the present invention is mounted is seated on a deck (300) of an automated liquid handling system.

FIG. 2 is a perspective view showing a deck 300 on which the separation device 100 according to one embodiment of the present invention is seated, where a multi-channel well plate 500 is mounted on the separation device 100. FIG. 3 is a perspective view showing the separation device 100 in a state in which the 96-well plate 500 is separated.

The separation device 100 according to one embodiment of the present invention is a device for separating a target substance that is reversibly bound to magnetic particles from a sample, and a device mounted on the deck of a general-purpose automated liquid handling system to separate the target substance from a sample liquid in the well plate using magnetism. On the separation device 100, various sample container arrays, such as a 96-well plate, a 96-well PCR plate, or the like, may be mounted.

8

Figure 3:
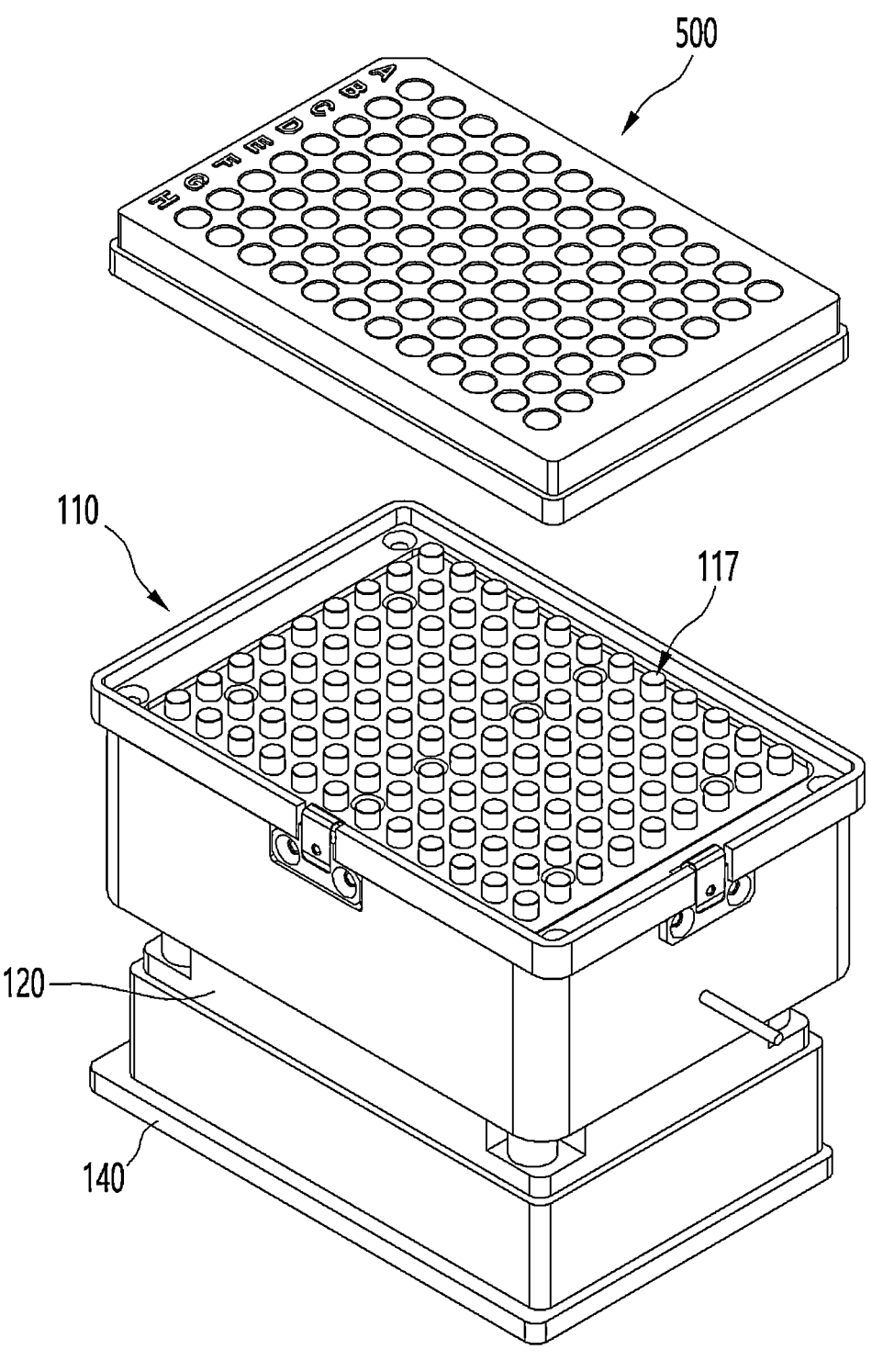
FIG. 3 is a perspective view showing the separation device (100) in a state in which the 96-well plate (500) is separated.
Figure 4:
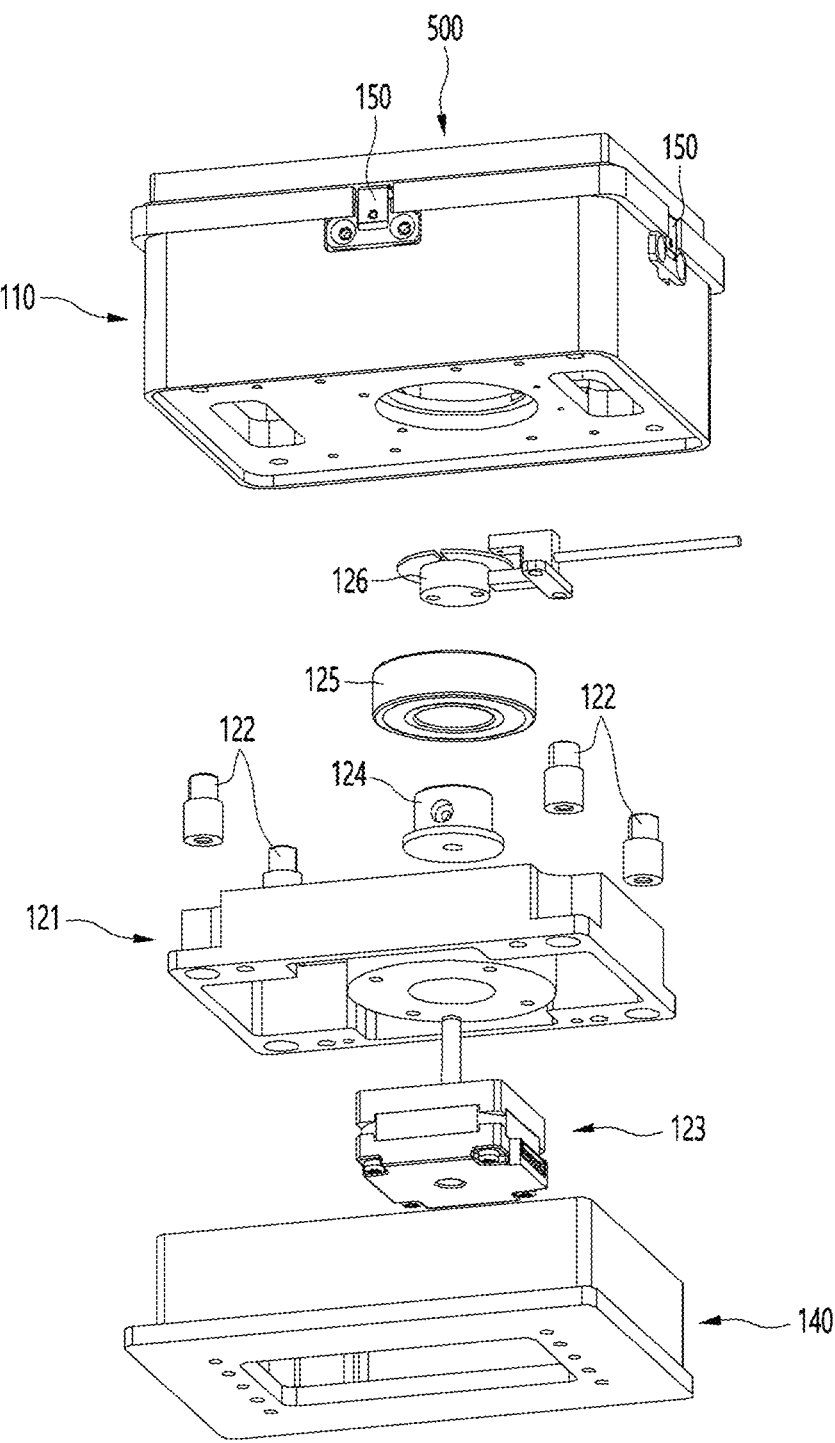
FIG. 4 is a partially exploded perspective view of the separation device according to one embodiment of the present invention.
Figure 5:
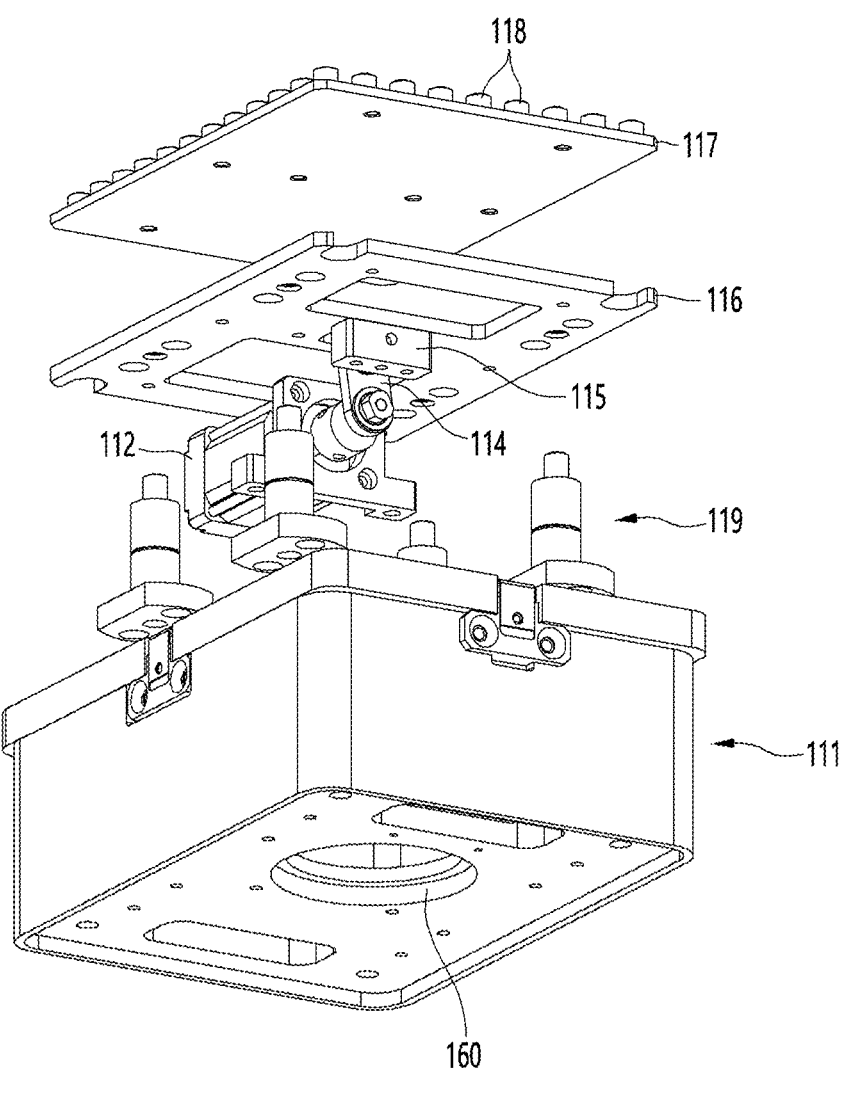
FIG. 5 is an exploded perspective view of a magnetic block of the separation device according to one embodiment of the present invention.

Referring to FIGS. 3 to 5, the separation device 100 includes a magnetic block 110 on which the well plate 500 or a deep well plate accommodating a sample is mounted and a shaking block 120 coupled to a lower portion of the magnetic block to transmit a rotational force so that the magnetic block and the well plate perform horizontal orbital motion. The shaking block 120 is coupled to a lower base portion 140. The base portion 140 supports a housing 121 of the shaking block 120 from below, and a lower end of the base portion is formed in a shape corresponding to the deck 300 to be seated on the deck 300.

Referring to FIGS. 3 to 5, the magnetic block 110 includes a magnetic plate 117 on which a plurality of magnets 118 are arranged, a vertical movement mechanism that transfers the magnetic plate in a vertical direction to control a vertical position of the magnetic plate, and a casing 111 that accommodates the vertical movement mechanism and the magnetic plate.

The magnetic plate 117 is a metal plate on which a plurality of magnets 118 are arranged on an upper surface and is fixed to the metal plate by a magnetic force of the magnets 118, but is not limited thereto. A plurality of magnet arrays may be fixed to a plastic plate rather than a metal plate by adhesive or the like, and the magnetic plate itself may be a magnetic material without the separate attachment magnets 118. According to FIG. 5, the support plate 116 is fastened to the lower portion of the magnetic plate 117 to support and fix the magnetic plate 117, and the vertical movement of the lower vertical movement mechanism is transmitted to the magnetic plate through the support plate 116 so that the magnetic plate moves up and down, but the support plate is not essential.

The vertical movement mechanism is accommodated in the casing 111 and may move the magnetic plate up and down, thereby applying or removing a magnetic field to the sample on the multi-well plate seated on the upper end of the magnetic block. That is, in a state in which the magnetic plate is moved upward to be adjacent to the well plate, a magnetic force may be applied to the well so that the target substance bound to the magnetic particles is agglomerated at the lower portion of the well. On the other hand, in a state in which the magnetic plate is moved downward from the well plate, the magnetic force may not be substantially applied so that agglomeration of the target substance is released.

The vertical movement mechanism includes a moving motor 112 fixedly installed inside the cylindrical casing 111, a link 114 that is eccentrically connected to a rotation shaft of the moving motor to convert the rotational movement of the moving motor into vertical movement, and a fixing member 115 fixed to a lower end of the support plate 116 to connect the link and the support plate. Alternatively, the fixing member 115 may be directly fixed to the magnetic plate 117 without using the support plate 116 to enable vertical movement of the magnetic plate. The magnetic plate 117 is transferred by the vertical movement mechanism and is disposed adjacent to and facing the lower portion of the well plate when positioned at an uppermost end.

Steps are formed on upper edges of the casing 111 as a seating portion on which the well plate 500 is seated. A plurality of detachable members 150 for detachably fixing the well plate seated on the seating portion to the casing are provided on an outer side of an upper end of the casing 111. The detachable members 150 are, for example, a hook assembly including a leaf spring and detachably fix the well plate 500 to the upper end of the casing 111.

Figure 6:
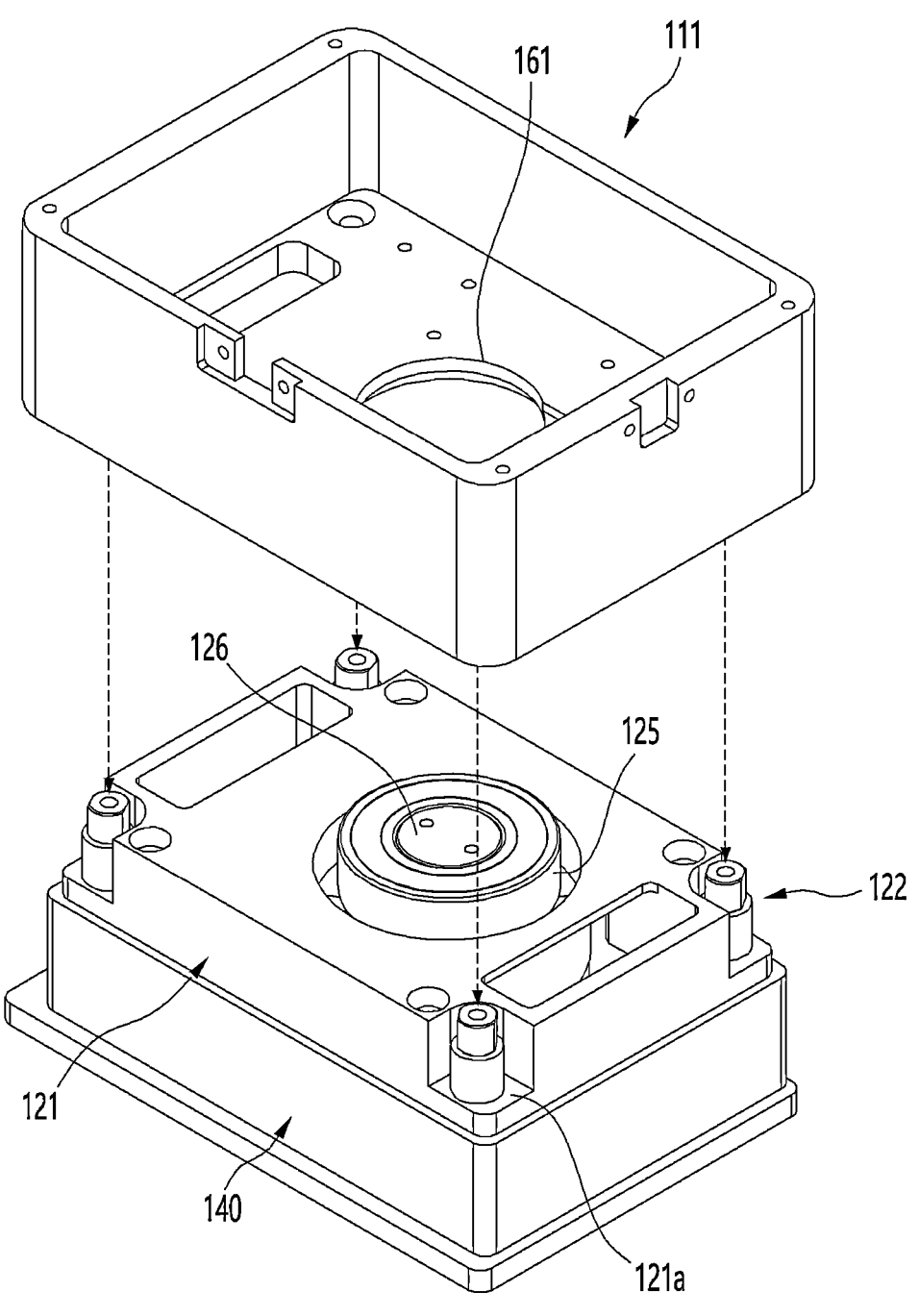
FIG. 6 is a view showing a coupling relationship between a casing of the magnetic block and a lower shaking block of the separation device according to one embodiment of the present invention.

Referring to FIGS. 4 and 6, the shaking block and a coupling relationship with the shaking block and the magnetic block will be described in detail.

The shaking block 120 may be coupled to the lower portion of the magnetic block 110 to transmit a rotational force so that the magnetic block performs orbital motion, and the magnetic block and the shaking block may be configured as an integrated single module to be easily mounted on the deck of the general-purpose liquid handling system as a small, compact component.

The lower shaking block 120 and the upper magnetic block 110 are directly coupled, but bearing coupling (160 and 125 in FIG. 6) is made in the central portion, and bolt coupling is made through elastic members at the four corners (see dotted lines in FIG. 6). In order to reduce friction between the shaking block 120 and the magnetic block 110, the magnetic block 110 and the shaking block 120 are vertically spaced apart from each other and are directly connected only at inner bearing coupling portions 160 and 125 and bolt coupling portions on an outer edge. Due to the coupling structure, an eccentric orbital rotational force may be generated in the lower shaking block 120 and transmitted to the upper well plate 500 via the casing 111 of the magnetic block 110 through the central portion or internal bearing coupling portions. That is, the lower shaking block 120 and the upper magnetic block 110 have to be coupled and physically integrated, but in the case of a general fastening structure, it is difficult to sufficiently transmit the eccentric orbital rotational force. In order to effectively make the target substance agglomerated at the lower portion of the well float in the liquid, simple rotational vibration is not enough, and orbital rotational movement in which the center of rotation slightly moves is required. Having a stable fastening structure between blocks and at the same time transmitting an orbital rotational force is a conflicting problem, and the present inventors have solved the problem by internal bearing coupling and fastening through symmetrical elastic members on the outside.

According to FIG. 4, the shaking block 120 includes a rotary motor 123, an eccentric cam 124 fixedly coupled to a shaft of the rotary motor, a bearing 125 and the housing 121. The eccentric cam 124 is inserted in an inner circumference of the bearing and an upper part of an outer circumference of the bearing is in contact with the annular insertion section. The housing 121 is coupled to the casing 111 by a plurality of elastic fasteners 122, and the rotary motor 123 is fixedly coupled to the housing 121.

Figure 7:
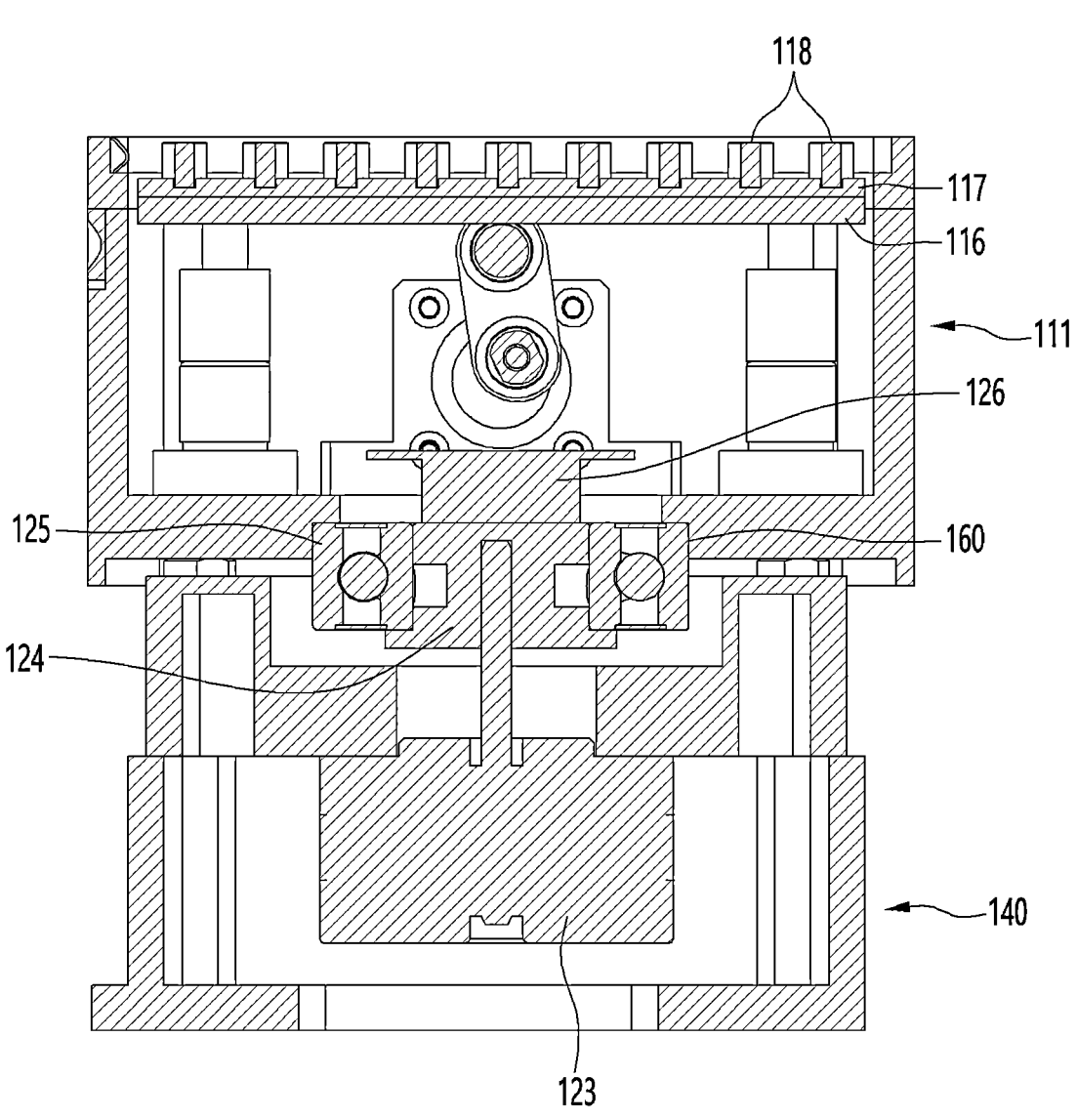
FIG. 7 is a perspective view showing a longitudinal cross-section of a separation device according to one embodiment of the present invention.

Referring to FIGS. 4 and 7, a recessed annular insertion section 160 is formed in the form of a step with a concave upward in a region of the bottom surface of the casing 111, preferably at the center of the bottom surface. A circular through-hole 161 may be formed in the center of the annular insertion section 160, and the step may have an upper edge protruding toward the center of the annulus. A concave portion is formed downward in an upper surface of the housing 121 to face the annular insertion section 160. The rotary motor 123 is fixed to a lower portion of a bottom of the concave portion, and the eccentric cam 124 coupled to the shaft of the rotary motor 123 is disposed through the center of the concave portion. Meanwhile, an inner diameter of the concave portion is larger than the outer diameter of the bearing, so that the bearing is positioned within the concave portion but is coupled to the shaft of the rotary motor so as not to contact the concave portion. The specific shape of the housing and the concave portion may be changed by design changes by a person skilled in the art. For example, the housing 121 may have a quadrilateral cylindrical shape with the top open, and the rotary motor 123 may be fixed to one surface of the housing without the concave portion.

An outer ring of the bearing 125 is closely inserted in an inner circumference of the annular insertion section 160. Specifically, the outer ring of the bearing is inserted from below into and in close contact with the annular insertion section 160 in the bottom of the casing 111, but an upper end of the outer ring is restricted from upward movement by a step protruding from an upper end of the inner diameter of the annular insertion section 160 (see FIG. 7). The inner ring of the bearing 125 is in close contact with the eccentric cam 124 coupled to the shaft of the rotary motor 123 so that the rotational force of the rotary motor 123 is transmitted to the casing 111 in close contact with the outer ring by the bearing. A central rotation shaft of the bearing 125 and the rotation shaft of the rotary motor 123 are eccentrically coupled, so that the rotational force of the rotary motor is transmitted to the casing 111 through the shaft, the eccentric cam, the bearing, and the annular insertion section, and thus the casing performs orbital motion.

A central portion 160 of the annular step is open, and in the open portion, the inner ring of the bearing and the eccentric cam 124 are positioned and a sensing disk 126 capable of sensing a motor rotation angle is positioned on the eccentric cam 124.

The shaft of the rotary motor is eccentric from the center of the bearing 125 by the eccentric cam 124, the outer circumference of the bearing is fixed to a lower portion of the casing, and a rotational force of the rotary motor causes orbital shaking of the magnetic block and the well plate detachably seated on the magnetic block through the eccentric cam and the bearing.

Meanwhile, a plurality of fastening seating portions 121a are formed to be concave downward on an outer edge of the housing 121 in the quadrilateral cylindrical shape with the bottom open. An elastic fastener 122 is disposed on each fastening seating portion 121a to connect the casing 111 and the housing 121. For example, the plurality of fastening seating portions 121a are formed in the form of steps on respective four corners of the housing.

Figure 8:
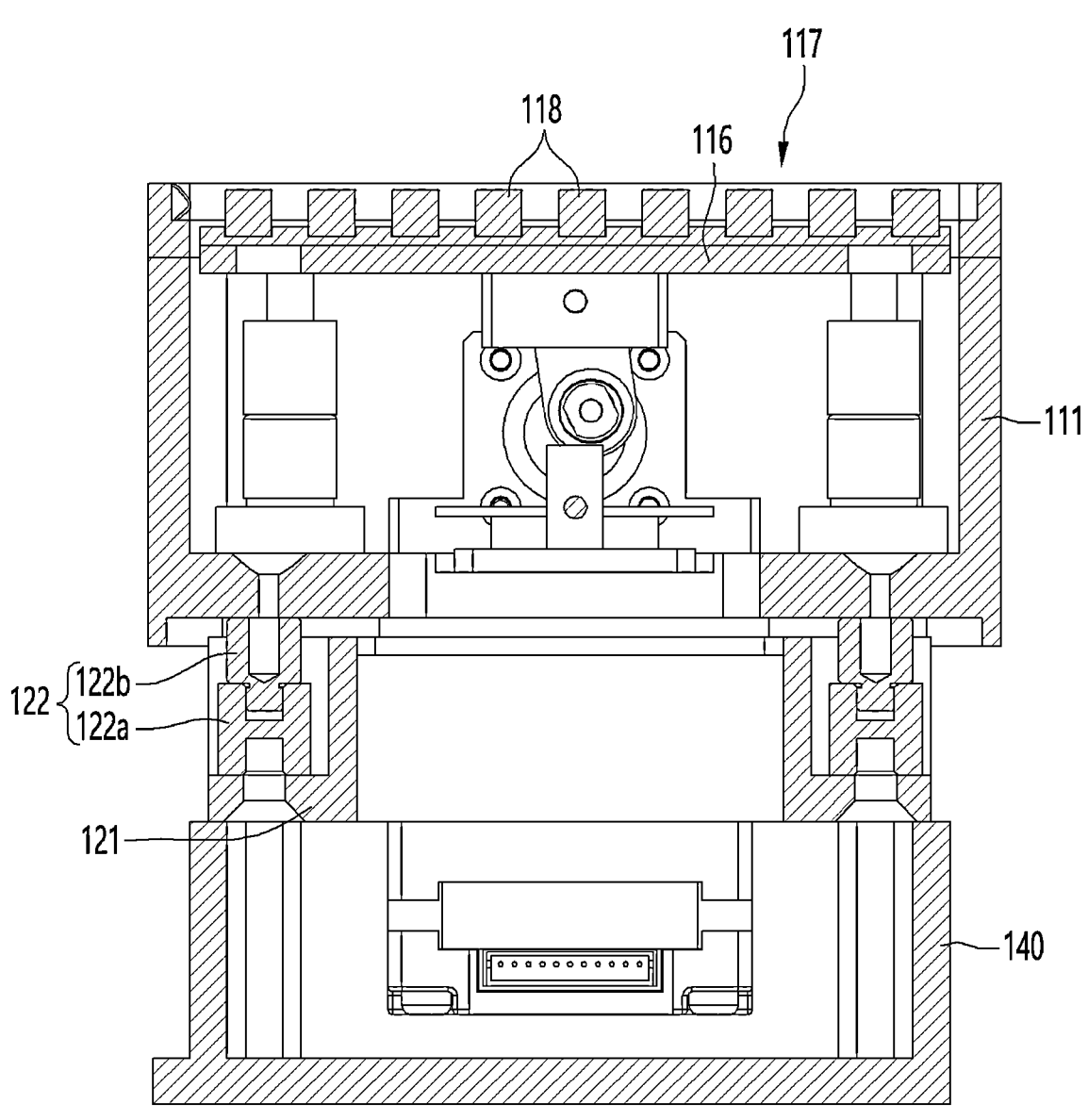
FIG. 8 is a cross-sectional view of the separation device according to one embodiment of the present invention in a different direction.

Referring to FIG. 8, each elastic fastener 122 includes an elastic member 122a made of a material such as rubber or silicone, and first and second fastening members (not shown) respectively coupled to upper and lower sides of the elastic member. The first and second fastening members may be screws, bolts, or the like. The elastic fastener 122 may further include a long extension member 122b to extend the length of the elastic member 122a. An upper portion of the first fastening member is fastened to a lower edge of the casing and a lower portion thereof is fixed to the elastic member, and an upper portion of the second fastening member is fixed to a lower portion of the elastic member and a lower portion thereof is fastened to the plurality of fastening seating portions 121a of the housing in the form of a step.

The housing has a quadrilateral cylindrical shape, and the fastening seating portions 121a may be formed on the respective four corners of the housing, but are not limited thereto and may be formed symmetrically on the outer sides of the housing. In a symmetrical method, the elastic fasteners 122 may be point-symmetrically positioned on the same plane with respect to the bearing center, or may be line-symmetrical with respect to a bearing center line.

As can be seen in FIGS. 7 and 8, since the casing and the housing are directly connected only at the bearing coupling portion on the inside and the bolt coupling portions on the outer edge and other parts are spaced apart from each other, the orbital motion through the bearing is transmitted and, at the same time, the orbital motion is performed uniformly for four points of the corners. In this case, an orbital range is preferably 1 mm, and for this purpose, the rotation shaft of the rotary motor and the center of the bearing are preferably eccentric by about 0.5 mm.

In order to reduce friction between the shaking block 120 and the magnetic block 110, the magnetic block 110 and the shaking block 120 are vertically spaced apart from each other, but the bearing outer ring and the annular insertion section 160 are in close contact with each other and the magnetic block 110 and the shaking block 120 are directly coupled on the outer sides (four points of the corners) by the elastic fasteners 122. When there is no elastic fastener, the rotational movement caused by the motor will be restrained from being transmitted to the casing as the orbital motion.

The housing of the shaker, which is the lower block, is detachably coupled to the casing of the upper block by the coupling structure of the casing and housing described above. Therefore, modularization in which various upper blocks are detachably coupled to the lower shaking block is possible.

A method of extracting, for example, nucleic acids from a biological sample using the separation device of the present invention is basically as follows. In the method below, it is preferable that the entire process is automatically performed by the liquid handling system. The automation method is performed by an information processing device including a power source, a processor, and a memory connected to motors, and since it is general, a separate description thereof will not be given.

A biological sample is mixed with a cell lysis solution injected into a well of a multi-well plate using an automatic pipette, and the sample mixed with the cell lysis solution is mixed with a binding solution injected into the well of the multi-well plate using the pipette. The mixture mixed with the binding solution using the pipette is mixed with a magnetic particle aqueous dispersion solution of magnetic particles injected into the well of the multi-well plate.

In a state in which the mixture mixed with the binding solution is aspirated into the pipette, a discharge pressure is applied to a pipette tip 201 so that the mixture is discharged from the pipette, and at the same time, a magnetic field is applied to the pipette so that magnetic particles of the magnetic particle aqueous dispersion solution in the mixture mixed with the binding solution and attachments attached to the magnetic particles are not discharged by the discharge pressure and remain inside the pipette. To apply the magnetic field, the magnetic plate is transferred upward to be close to the well plate.

The magnetic field is released and impurities other than nucleic acids are removed from the magnetic particles by mixing the magnetic particles and the attachments attached to the magnetic particles with a washing solution containing alcohol injected into the well of the multi-well plate kit. To release the magnetic field, the magnetic plate is transferred downward to be away from the well plate.

In a state in which the mixture mixed with the washing solution is aspirated into the pipette, a discharge pressure is applied to the pipette so that the mixture is discharged from the pipette, and at the same time, a magnetic field is applied to the pipette so that the magnetic particles to which nucleic acids are attached in the mixture mixed with the washing solution are not discharged by the discharge pressure and remain inside the pipette. To apply the magnetic field, the magnetic plate is transferred upward to be close to the well plate.

In order to release the magnetic field, the magnetic plate is transferred downward to be away from the well plate, a suspension is injected into the well, and orbital rotation is applied to the well plate by operating the rotary motor of the shaking block so that the magnetic particles to which the nucleic acids are attached float to the top of the suspension. The magnetic particles to which nucleic acids are attached are separated by aspiration by the pipette.

Meanwhile, according to another embodiment of the present invention, a shaking block may be applied to various modular devices so that the shaking block may be mounted on a deck of a liquid handling system as well as a separation device. For example, a coupling structure of a lower shaking block and a casing according to one embodiment of the present invention may be equally applied to a thermal shaker. Since the casing of the thermal shaker has the same or similar structure as the casing of the magnetic block described above, detailed description thereof is omitted. However, a thermoelectric element, a circuit, and/or a cooling channel for temperature control may be provided in the casing instead of the magnetic plate or the vertical movement mechanism.

The thermal shaker (shaking device) is configured as a single module by coupling an upper temperature control block and the lower shaking block. Since the shaking block below the thermal shaker has the same structure as the shaking block described above, description thereof is omitted.

The casing and the lower shaking block may be applied not only to the thermal shaker but also to devices for other experiments or the like, and in this case, have the same structure as well.

That is, various modular shaking devices may include a casing that includes a plurality of components therein, and a shaking block that is detachably coupled to a lower portion of the casing and transmits a rotational force to the casing through a bearing coupling portion. The shaking block includes a rotary motor, a bearing, and a housing, and the casing and the housing are fixedly coupled vertically by fastening of a plurality of elastic fasteners. The casing and the housing are vertically spaced apart from each other and are directly connected only by the bearing coupling portion and the plurality of elastic fasteners, and the plurality of elastic fasteners fasten the casing and the housing so that the relative positions thereof may vary by a predetermined deviation. The detailed structure of the shaking block is the same as the shaking block of the separation device described above.

INDUSTRIAL APPLICABILITY

Embodiments of the present invention have industrial applicability as devices capable of being used for automation of bio and pharmaceutical production and experiments.

The invention claimed is:

1. A separation device for separating a target substance bound to magnetic particles from a sample, comprising:
   a magnetic block including a magnetic plate, a vertical movement mechanism for transferring the magnetic plate up and down in a vertical direction to control a vertical position of the magnetic plate, and a casing which accommodates the vertical movement mechanism and the magnetic plate, and having a seating portion formed at an upper end of the casing; and
   a shaking block coupled to a lower portion of the magnetic block and configured to transmit a rotational force through a bearing coupling portion to the magnetic block such that the magnetic block performs orbital motion, wherein the magnetic block and the shaking block are vertically coupled together by a plurality of elastic fasteners, the magnetic block and the shaking block are vertically spaced apart from each other and are directly connected only by the bearing coupling portion and the plurality of elastic fasteners, and the plurality of elastic fasteners couple the magnetic block with the shaking block such that relative positions thereof are variable by a predetermined deviation, wherein the magnetic plate is transferred by the vertical movement mechanism and is disposed adjacent to and facing a lower portion of a well plate seated on the seating portion when positioned at an uppermost end, and the vertical movement mechanism includes a moving motor fixed inside the casing, a link connected to a rotation shaft of the moving motor to convert rotational motion of the moving motor into vertical motion, and a fixing member connecting the link to the magnetic plate.

2. A separation device for separating a target substance bound to magnetic particles from a sample, comprising:

a magnetic block including a magnetic plate, a vertical movement mechanism for transferring the magnetic plate up and down in a vertical direction to control a vertical position of the magnetic plate, and a casing which accommodates the vertical movement mechanism and the magnetic plate; and a shaking block coupled to a lower portion of the magnetic block and configured to transmit a rotational force through a bearing coupling portion to the magnetic block such that the magnetic block performs orbital motion, wherein the magnetic block and the shaking block are vertically coupled together by a plurality of elastic fasteners, the magnetic block and the shaking block are vertically spaced apart from each other and are directly connected only by the bearing coupling portion and the plurality of elastic fasteners, and the plurality of elastic fasteners couple the magnetic block with the shaking block such that relative positions thereof are variable by a predetermined deviation, wherein each of the plurality of elastic fastener includes an elastic member and first and second fastening members respectively coupled to upper and lower sides of the elastic member, and the vertical movement mechanism includes a moving motor fixed inside the casing, a link connected to a rotation shaft of the moving motor to convert rotational motion of the moving motor into vertical motion, and a fixing member connecting the link to the magnetic plate.

3. A separation device for separating a target substance bound to magnetic particles from a sample, comprising:

a magnetic block including a magnetic plate, a vertical movement mechanism for transferring the magnetic plate up and down in a vertical direction to control a vertical position of the magnetic plate, and a casing which accommodates the vertical movement mechanism and the magnetic plate; and a shaking block coupled to a lower portion of the magnetic block and configured to transmit a rotational force through a bearing coupling portion to the magnetic block such that the magnetic block performs orbital motion, wherein the magnetic block and the shaking block are vertically coupled together by a plurality of elastic fasteners, the magnetic block and the shaking block are vertically spaced apart from each other and are directly connected only by the bearing coupling portion and the plurality of elastic fasteners, and the plurality of elastic fasteners couple the magnetic block with the shaking block such that relative positions thereof are variable by a predetermined deviation, wherein each of the plurality of elastic fasteners is bolts with an elastic member between the bolts, and the elastic member is rubber or silicone, and the vertical movement mechanism includes a moving motor fixed inside the casing, a link connected to a rotation shaft of the moving motor to convert rotational motion of the moving motor into vertical motion, and a fixing member connecting the link to the magnetic plate.

4. A separation device for separating a target substance bound to magnetic particles from a sample, comprising:

a magnetic block including a magnetic plate, a vertical movement mechanism for transferring the magnetic plate up and down in a vertical direction to control a vertical position of the magnetic plate, and a casing which accommodates the vertical movement mechanism and the magnetic plate; and a shaking block coupled to a lower portion of the magnetic block and configured to transmit a rotational force through a bearing coupling portion to the magnetic block such that the magnetic block performs orbital motion, wherein the magnetic block and the shaking block are vertically coupled together by a plurality of elastic fasteners, the magnetic block and the shaking block are vertically spaced apart from each other and are directly connected only by the bearing coupling portion and the plurality of elastic fasteners, and the plurality of elastic fasteners couple the magnetic block with the shaking block such that relative positions thereof are variable by a predetermined deviation, wherein the shaking block includes:

a housing;

a rotary motor fixed to the housing;

an eccentric cam fixedly coupled to a shaft of the rotary motor; and a bearing, wherein the plurality of elastic fasteners are positioned symmetrically to each other on outer sides of the housing, the housing is coupled to the casing by the plurality of elastic fasteners, and the shaft of the rotary motor is eccentric from the center of the bearing by the eccentric cam, an outer diameter of the bearing is fixed to a bottom portion of the casing, thereby a rotational force of the rotary motor causes orbital shaking of the magnetic block and a well plate, which is detachably seated on the magnetic block, through the eccentric cam and the bearing.

5. The separation device of claim 4, wherein: an annular insertion section, in which the bearing is inserted, is formed in one region of a bottom of the casing such that an outer circumference of the bearing is in contact with an inner circumference of the insertion section, the housing has a quadrilateral container shape, with steps formed at four corners, so that the plurality of elastic fasteners are respectively positioned on the steps, each of the plurality of elastic fastener includes an elastic member and first and second fastening members respectively coupled to upper and lower parts of the elastic member, and an upper portion of the first fastening member is coupled to a lower edge of the casing and a lower portion thereof is fixed to the elastic member, and an upper portion of the second fastening member is fixed to a lower portion of the elastic member and a lower portion thereof is fastened to a step of the housing.

* * * * *